United States Patent [19]
Kasai

[11] Patent Number: 5,883,731
[45] Date of Patent: Mar. 16, 1999

[54] MULTI-BEAM SCANNING DEVICE

[75] Inventor: Toshio Kasai, Tokyo, Japan

[73] Assignee: Asahi Kogaku Kogyo Kabushiki Kaisha, Tokyo, Japan

[21] Appl. No.: 781,596

[22] Filed: Jan. 9, 1997

[30] Foreign Application Priority Data

Jan. 12, 1996 [JP] Japan .................................. 8-022132

[51] Int. Cl.[6] .............................................. G02B 26/08
[52] U.S. Cl. ......................... 359/204; 347/236; 347/237
[58] Field of Search ........................... 359/204; 347/135, 347/236, 237

[56] References Cited

U.S. PATENT DOCUMENTS

| | | | |
|---|---|---|---|
| 4,796,964 | 1/1989 | Connell et al. .................... | 359/204 |
| 4,973,989 | 11/1990 | Yamamoto .......................... | 347/258 |
| 5,432,537 | 7/1995 | Imakawa et al. .................... | 347/135 |

*Primary Examiner*—Cassandra Spyrou
*Assistant Examiner*—Darren E. Schuberg
*Attorney, Agent, or Firm*—Greenblum & Bernstein, P.L.C.

[57] ABSTRACT

Disclosed is a multi-beam laser scanning device which scans a surface to be scanned with a plurality of laser beams in accordance with an image data. Each image data includes driving pulses which periodically occur in each image data, and are representative of intensity of laser beams. Phase of the image signals are shifter with each other so that the driving pulses do not overlap within a period of the driving pulses.

16 Claims, 6 Drawing Sheets

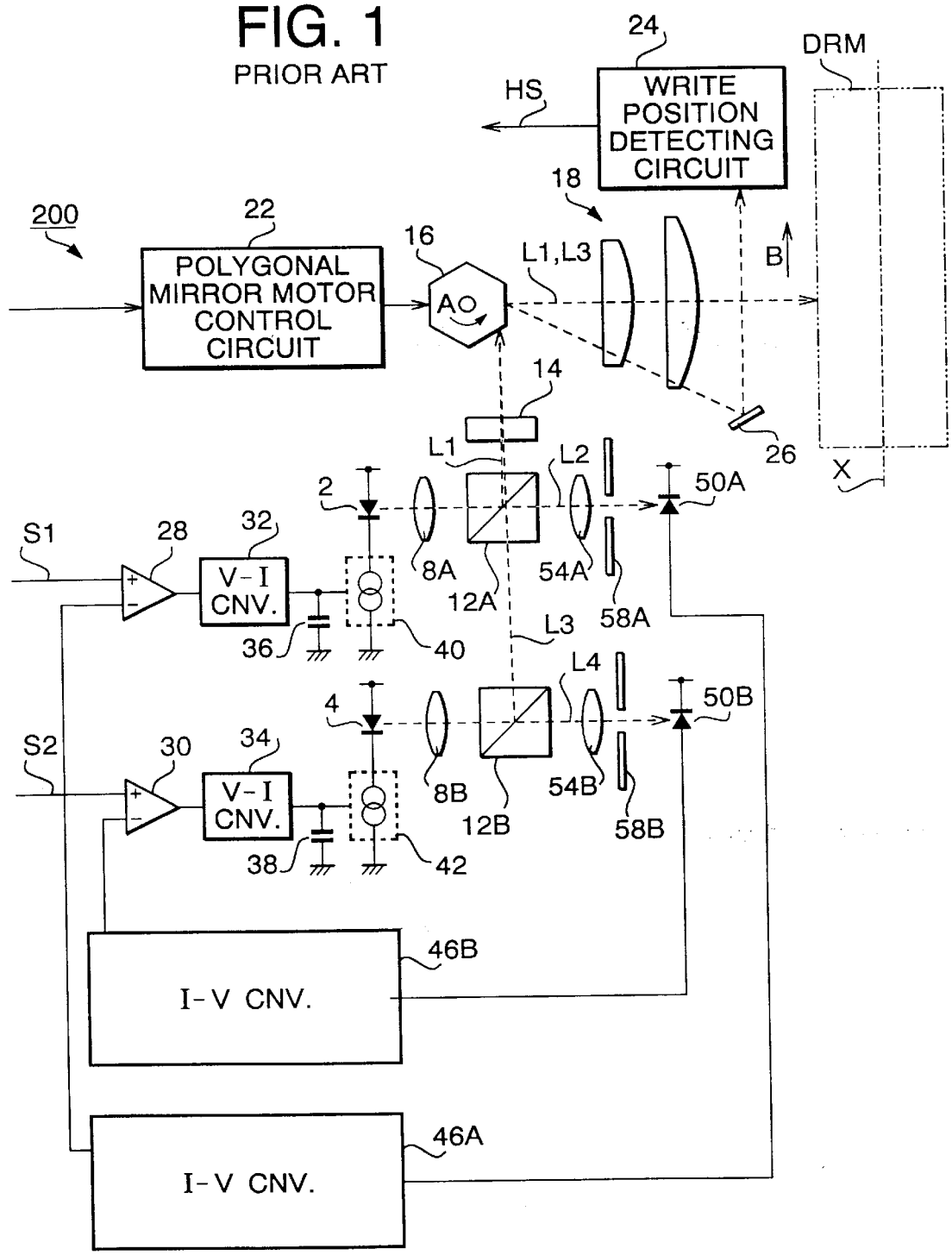

HS

CLK

S1
0V

S2
0V

FIG. 5(a)
FIG. 5(b)
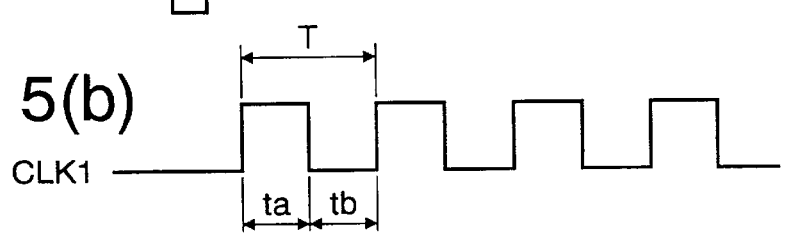
FIG. 5(c)
FIG. 5(d)
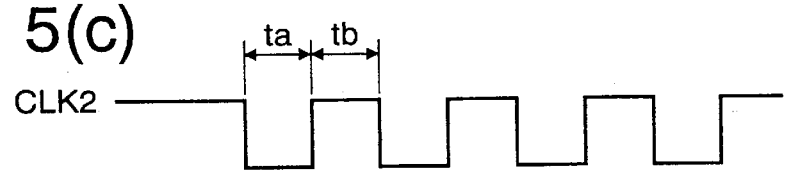
FIG. 5(e)
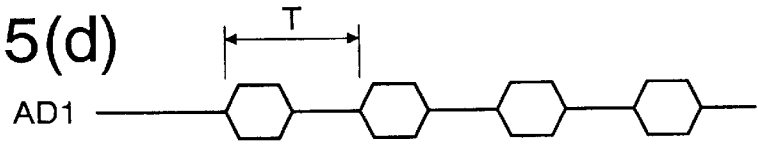
FIG. 5(f)
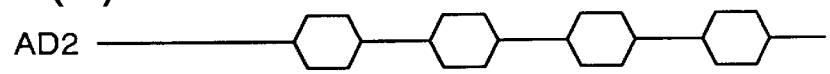
FIG. 5(g)
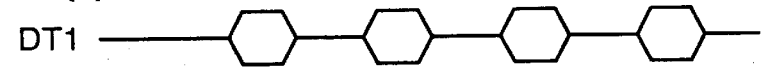
FIG. 5(h)
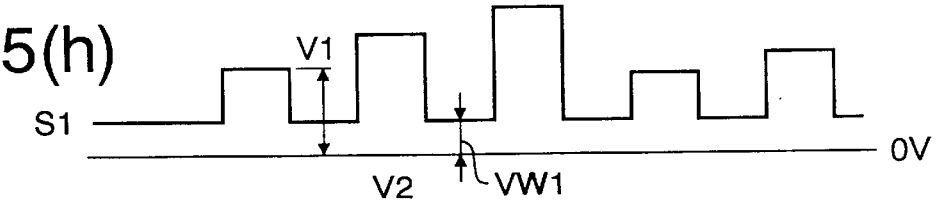
FIG. 5(i)
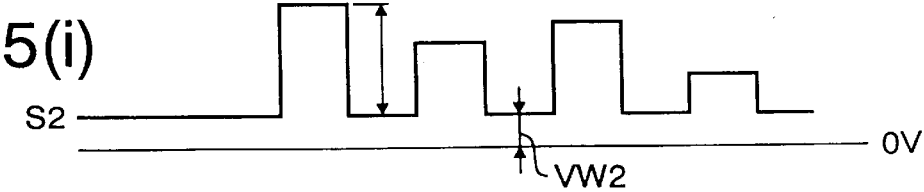

MULTI-BEAM SCANNING DEVICE

BACKGROUND OF THE INVENTION

The present invention relates to a multi-beam scanning device which simultaneously emits a plurality of scanning beams for scanning a surface to be scanned.

Conventionally, a laser beam printer which utilizes a scanning laser beam has been known as an outputting device for a computer and the like. The laser beam printer emits a laser beam to form a spot of light on a surface to be scanned (i.e., a photoconductive surface). The laser beam is ON/OFF modulated in accordance with an image data as the laser beam scans the scanned surface.

Recently, a gradation image has been desired by a user, and a laser beam printer which is capable of controlling a laser diode to emit various levels of intensity of the laser beam has become available.

In such a type of the printer, the intensity of the laser beam is controlled in accordance with the tone density of each pixel. In order to form an image having a desired gradation, controlling of the intensity of the emitted laser beam is important. That is, the laser diode should be driven quickly and accurately in accordance with the image data which carries the gradation information for each pixel. In order to control the intensity of the laser beam, an APC (Automatic Power Control) system has been employed. The APC system is a system in which the intensity of the emitted laser beam is detected with use of a photo sensor and the detection result is fed back to a driver of the laser diode so that the intensity of the output laser diode is adjusted quickly. An example of such a control is disclosed in a U.S. patent application Ser. No. 08/680,649, teaching of which is incorporated herein by reference.

On the other hand, recently, in order to increase an imaging speed and/or resolution of the formed image, a printer which emits more than one laser beam at the same time to form a plurality of scanning line images has been developed. In such a printer, a plurality of laser diodes are provided and driven to emit a plurality of laser beams. In such a printer using a plurality of laser beams, it is possible to form a gradation image by controlling intensity of laser beams emitted by the respective laser diodes.

FIG. 1 is a block diagram showing a main part of a conventional laser scanning unit which is capable of forming a gradation image with use of two laser diodes driven simultaneously.

The conventional laser scanning unit 200 has two laser diodes 2 and 4. The laser beam emitted by the laser diode 2 is converted into a parallel beam by a collimator lens 8A, and then split by a beam splitter 12A into two beams L1 and L2. The beam L1 is used for scanning, and the beam L2 is used for the APC operation.

The beam L1 split by the beam splitter 12A is converged in a direction perpendicular to a plane of FIG. 1 (which direction is referred to as an auxiliary scanning direction hereafter) by a cylindrical lens 14, and directed to a polygonal mirror 16.

The polygonal mirror 16 is rotated in a direction indicated by arrow A under a control of a polygonal mirror motor control circuit 22. The polygonal mirror 16 has a plurality of reflection surfaces. As the polygonal mirror 16 rotates, the incident angle of the laser beam with respect to a reflecting surface of the polygonal mirror 16 varies and accordingly the reflected beam scans on the photoconductive surface of the photoconductive drum in a main scanning direction which is indicated by arrow B.

The beam L1 is reflected by a reflection surface of the polygonal mirror 16, passed through an fθ lens, and scans on a surface of a photoconductive drum DRM of a printer in a direction indicated by an arrow B (i.e., the main scanning direction). If the photoconductive surface of the drum DRM is uniformly charged, and the intensity of the scanning laser beam L1 is modulated in accordance with an image data, an electrostatic line image is formed as the main scanning is performed.

The laser beam emitted by the laser diode 4 is made into a parallel beam by a collimator lens 8B, split into a beam L3 for scanning, and a beam L4 for the APC operation. The beam L3 is, similarly to the beam L1, converged by the lens 14 in the auxiliary scanning direction, deflected by the polygonal mirror 16, and scans on the photoconductive surface of the photoconductive drum DRM through the fθ lens 18. The incident positions of the beams L1 and L3 on the photoconductive drum DRM are slightly apart in the auxiliary scanning direction. Accordingly, at each scanning operation, the laser beams L1 and L3 scan on the surface of the photoconductive drum DRM in the main scanning direction B. Therefore, two adjacent parallel line images respectively extending in the main scanning direction are formed.

The photoconductive drum DRM is made rotatable about an axis X which extends substantially parallel to the main scanning direction B. By rotating the photoconductive drum DRM while the main scanning operation is repeatedly performed, a two dimensional image is formed on the photoconductive surface of the photoconductive drum DRM. In the description hereafter, a scanning line on the downstream side with respect to the rotating direction of the photoconductive drum is referred to as an upper scanning line, and the scanning line on the upstream side with respect to the rotating direction of the photoconductive drum is referred to as a lower scanning line.

A mirror 26 is provided to reflect the laser beams L1 and L3 directed to a position where the laser beams L1 and L3 do not contribute to form a latent image on the photoconductive surface of the photoconductive drum DRM. The laser beams L1 and L3 are reflected by the mirror 26 and directed towards a light receiving portion of a write position detecting circuit 24. The write position detecting circuit 24 generates a pulse signal as the laser beams L1 and L3 are incident to the light receiving portion thereof, and outputs the generated pulse as a horizontal synchronizing signal HS. The horizontal synchronizing signal HS is used for reading an image data from an image memory and for modulating the laser beams L1 and L3 to form an latent image on the photoconductive surface of the photoconductive drum DRM.

The latent image formed on the surface of the photoconductive drum DRM is developed by applying toner to form a toner image, and then the toner image is transferred and fixed onto a recording sheet (not shown).

The laser beam L2 split by the beam splitter 12A is converged by a lens 54A, passed through an aperture 58A, and is incident to a photo diode 50A. Similarly, the laser beam L4 is converged by a lens 54B, passed through an aperture 58B, and is incident to a photo diode 50B.

The photo diodes 50A and 50B generate electrical current corresponding to the intensity of received light, i.e., the photo diode 50A generates current corresponding to the intensity of the laser beam L2, and the photo diode 50B generates current corresponding to the intensity of the laser beam L4.

The electrical current generated by the photo diode 50A is converted into a voltage value by an I-V converter 46A, and the electrical current generated by the photo diode 50B is converted into a voltage value by an I-V converter 46B.

The output voltages of the I-V converters 46A and 46B are applied to inverting input terminals of differential amplifiers 28 and 30, respectively.

To the non-inverting input terminals of the differential amplifiers 28 and 30, image signals S1 and S2 are applied. Each of the differential amplifiers 28 and 30 outputs a voltage which is proportional to a difference between voltages applied to the non-inverting input terminal and to the inverting input terminal. V-I converters 32 and 34 convert output voltages of the differential amplifiers 28 and 30 into electrical current, and charge or discharge hold condensers 36 and 38, respectively.

Charged voltages of the hold condensers 36 and 38 are respectively applied to V-I converters 40 and 42, which output electrical current proportional to the voltages applied thereto. The laser diodes 2 and 4 emit laser beams, each of which corresponds to the electrical current flowing therethrough. The emitted laser beams are split by the beam splitters 12A and 12B. The laser beams L2 and L4 are received by the photo diodes 50A and 50B, I-V converted by the I-V converters 46A and 46B, and the intensity of the laser beams are feed-back controlled (i.e., the APC operation is performed) as described above. With this APC operation, the intensity of the laser beams are adjusted quickly in accordance with the input image signals S1 and S2.

FIGS. 2(a)–2(d) show a timing chart illustrating the relationship between the horizontal synchronizing signal HS, the clock signal CLK, the image signals S1 and S2.

In response to the horizontal synchronizing signal HS, which is generated by the write position detection circuit 24, the clock signal CLK having a predetermined period T is generated. Then, synchronously with the clock signal CLK, the image data S1 and S2 are input to the differential amplifiers 28 and 30, respectively.

As described above, with a conventional laser scanning unit capable of emitting a plurality of laser beams at the same time, it is possible to form a gradation image. However, in order to perform the APC operation for each pixel, the number of the beam splitters, converging lenses, apertures and photo diodes should be the same as the number of the laser diodes. Therefore, employment of a plurality of laser diodes increases manufacturing cost, and further increases the size of the scanning device.

SUMMARY OF THE INVENTION

It is therefore an object of the invention to provide an improved multi-beam laser scanning unit which is decreased in cost and in size, but maintain the advantage of using a plurality of laser beams at each scanning.

For the above object, according to an aspect of the invention, there is provided a laser scanning device which scans a surface to be scanned with a plurality of laser beams in accordance with an image data, comprising: a plurality of light sources for outputting the plurality of laser beams, respectively; a deflecting member which deflects the plurality of laser beams to scan on the surface to be scanned, a plurality of scanning lines being formed on the surface to be scanned at one scanning operation; a driving system, which drives the plurality of light sources, not simultaneously, in accordance with the image data.

Optionally, each of the light sources can be driven at every predetermined period, and wherein the light sources are driven, not simultaneously, within the predetermined period.

Further, a timing at which each of the plurality of light sources is driven can be shifted, within each of the predetermined period, by an amount T/n, wherein T is a time duration of the predetermined period, and n is the number of the light sources to be driven.

Note that the light source may be a laser diode.

Alternatively, the light sources are driven sequentially within the predetermined period.

Further, the laser scanning device may include a device for adjusting scanning positions between each of the plurality of scanning lines.

Each of the plurality of light sources has a light emitting portion, and the adjusting device may have a mounting member on which the light emitting portion of each of the light sources is mounted. In this case, the light emitting portion being arranged so that a displacement between each scanning line in a scanning direction is cancelled.

Further, the device may have a device for adjusting the intensity of the laser beam emitted by each of the light source in accordance with the image data, the adjusting device including a feed-back control system.

Still further the feed-back control system may include a device for detecting a difference between an intensity of an emitted laser beam and an intensity according to the image data, and then controlling the driving system to adjust the intensity of the laser beam in accordance with the detected difference.

According to another aspect of the invention, there is provided a laser scanning device which scans a surface to be scanned with a plurality of laser beams in accordance with an image data, comprising a plurality of light sources for outputting the plurality of laser beams, respectively; a polygonal mirror having a plurality of reflecting surfaces, the polygonal mirror deflecting the plurality of laser beams to scan on the surface to be scanned, a plurality of scanning lines being formed on the surface to be scanned at one scanning operation; an image signal outputting unit, the outputting unit outputting image signals for the plurality of light sources, respectively, each of the image signals including a plurality of driving pulses, each of the driving pulses representing an intensity of light of the laser beam, the driving pulses of each of the image signals being generated at every predetermined period, phases of the image signals being shifted within the predetermined period; and a driving system for the plurality of light sources, the driving system driving the plurality of light sources in accordance with the driving pulses.

Optionally, the driving pulses of the plurality of image signals are generated alternately within the predetermined period.

Alternatively, the driving pulses of the plurality of image signals are generated sequentially within the predetermined period.

One driving pulse is included in each of the plurality of image signals within the predetermined period.

Optionally, the phase difference between each image signal is expressed as T/n, where T is a time duration of the predetermined period, and n is the number of the image signals.

Still optionally, the laser scanning device further includes an image position adjusting mechanism which compensates a displacement of image position formed by the plurality of light sources caused by the phase difference between each image signal.

Further, each of the plurality of light sources has a laser diode and an optical fiber, an end of the optical fiber being secured to a light emitting portion of the laser diode. The adjusting mechanism has a supporting plate member on which the other ends of the optical fibers are supported such that the other ends of each of the optical fibers (i.e., the light emitting portions of the optical fibers) are apart from each other by a first distance in a scanning direction of the laser beams, and by a second distance in a direction perpendicular to the scanning direction of the laser beams.

Further optionally, each of the driving pulses represents one of a plurality of gradation levels.

Furthermore, the driving system can perform a feed-back control for adjusting the intensity of the laser beam emitted by each of the light source in accordance with the image data.

Further, widths of the driving pulse are determined such that the driving pulses for the plurality of image signals alters within the predetermined period.

DESCRIPTION OF THE ACCOMPANYING DRAWINGS

FIG. 1 is a block diagram showing a main part of a conventional laser scanning unit which is capable of forming a gradation image with use of two laser diodes driven simultaneously;

FIGS. 2(a)–2(d) show a timing chart illustrating the relationship between the horizontal synchronizing signal HS, the clock signal CLK, the image signals S1 and S2 of the laser scanning unit of FIG. 1;

FIGS. 3 and 4 show a block diagram of a main part of a multi-beam laser scanning device embodying the present invention;

FIGS. 5(a)–5(i) show a timing chart illustrating the relationships of various signals;

FIG. 6 shows an arrangement the laser diodes and optical fibers; and

FIGS. 7(a)–7(b) show a scanning lines formed by two laser beams.

DESCRIPTION OF THE EMBODIMENT

Figure 3:
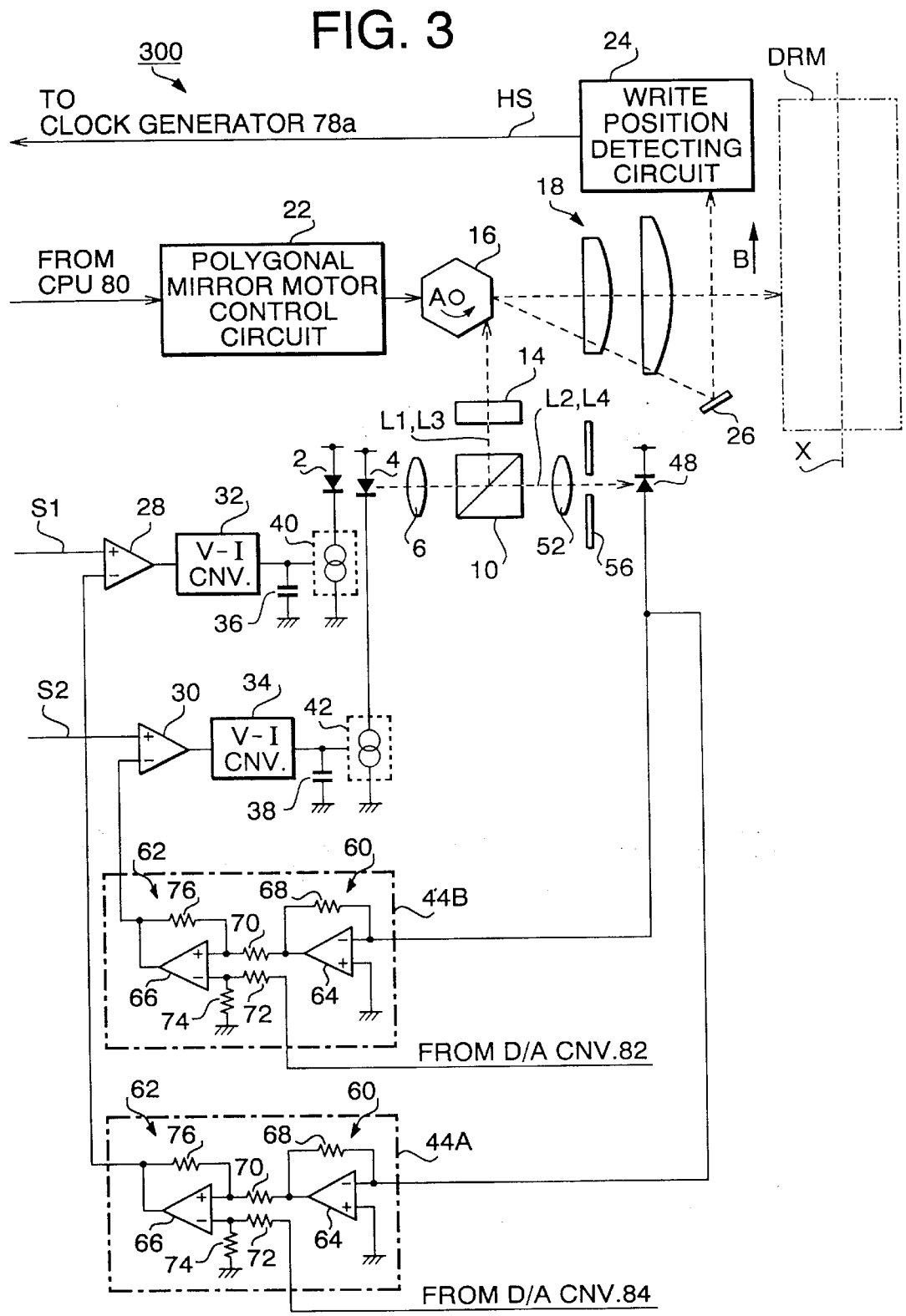
Figure 4:
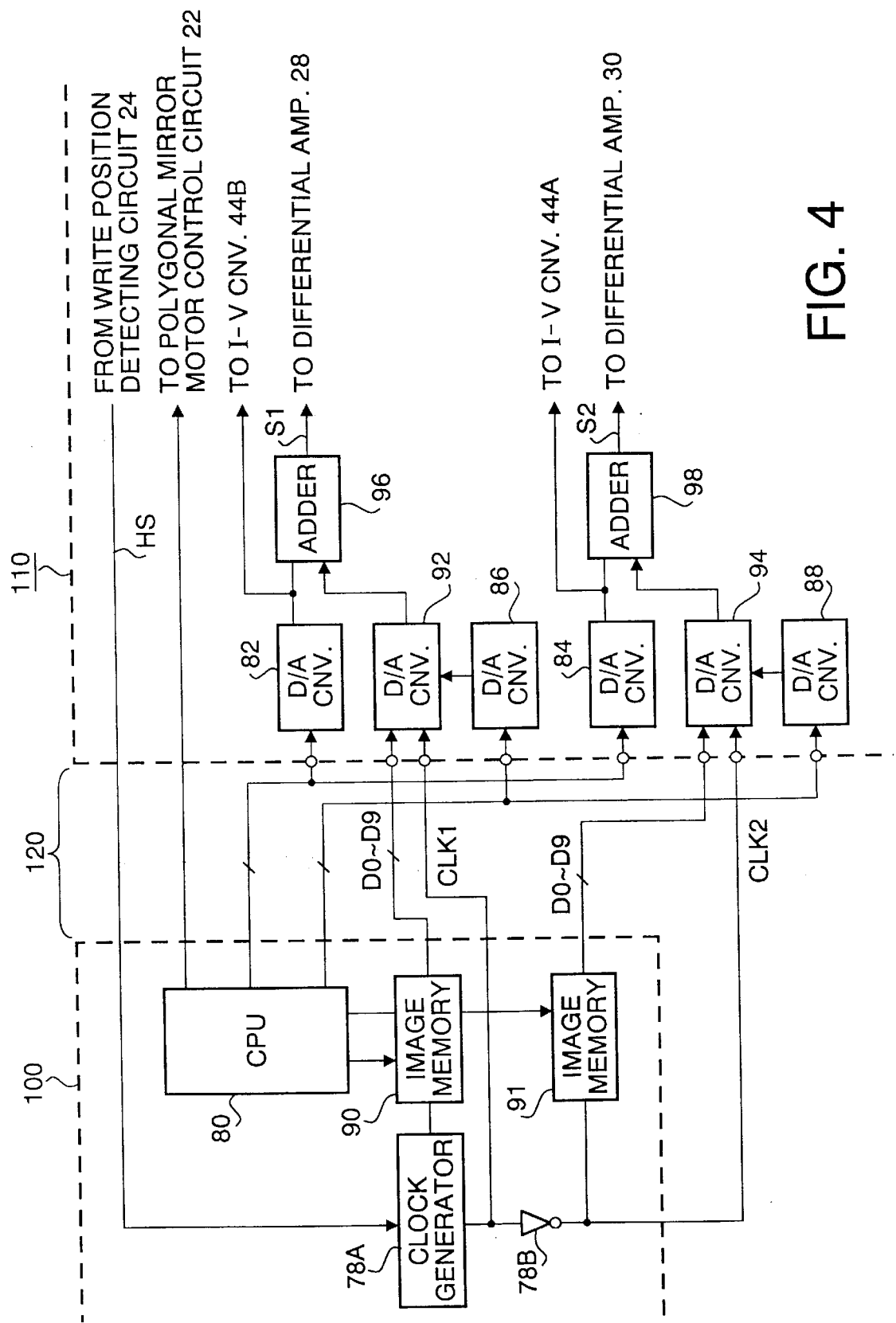

FIGS. 3 and 4 show a block diagram of a main part of a multi-beam laser scanning device 300, which is an embodiment of the present invention, and employed in a laser beam printer. In the drawings referred to hereafter, elements similar to those used in FIG. 1, are given the same reference numerals.

The laser scanning device 300 has two laser diodes 2 and 4 which are driven independently to emit laser beam modulated in accordance with an image data.

In the laser scanning device 300, a laser beam emitted by the laser diode 2 is made into a parallel beam as it is passed through a collimator lens 6, and directed to a beam splitter 10. By the beam splitter 10, the incident laser beam is split into two beams L1 and L2. The beam L1 is used for scanning operation, and the beam L2 is used for adjusting the intensity of the beam (i.e., used for the APC operation, which will be described later).

Similarly, a laser beam emitted by the laser diode 4 is passed through the collimator lens 6, and then split into two beams L3 and L4: the beam L3 is for scanning operation; and the beam L4 is for adjustment of the intensity thereof. According to the embodiment, in order for adjusting the intensity of the laser beams emitted by the laser diodes 2 and 4 with use of only one photo diode 48, the laser diodes 2 and 4 are driven such that they do not emit the beams, in accordance with an image data, at the same time, but are driven sequentially. The laser beam emitted by the laser diode 2 or 4 is converged by a lens 52, passed through an aperture 56, and then received by the photo diode 48. By changing the size of the aperture 56, the amount of light received by the photo diode 48 is adjusted.

When the photo diode 48 receives the laser beam, an electrical current corresponding to the intensity of the received beam is available across the photo diode 48. The electrical current across the photo diode 48 is converted into a voltage value by an I-V converter (current-to-voltage converter) 44A or 44B. Note that the output voltage of the I-V converter 44A is applied to an inverting input terminal of a differential amplifier 28 as a feed-back voltage, and the output voltage of the I-V converter 44B is applied to an inverting input terminal of a differential amplifier 30 also as a feed-back voltage.

As shown in FIG. 3, the I-V converters 44A and 44B have the same structure, which includes: an I-V converting circuit 60 utilizing an operational amplifier 64, and an inverting amplifier 62 utilizing an operational amplifier 66. Each inverting input terminal of the operational amplifier 64 is connected to an anode of the photo diode 48. Each inverting input terminal of the operational amplifier 64 is also connected to the output terminal of the operational amplifier 64, through a resistor 68. The non-inverting input terminals of the operational amplifiers 64 and 64 are grounded.

In each of the I-V converters 44A and 44B, an inverting input terminal of the operational amplifier 66 is connected to the output terminal of the operational amplifier 64 via a resistor 70, Further, the inverting input terminal of the operational amplifier 66 is connected to the output terminal thereof via a resistance 76. A non-inverting input terminal of each operational amplifier 66 is grounded through a resistor 74.

Further, the non-inverting input terminal of the operational amplifier 66 of the I-V converter 44A is connected to a D/A (digital-to-analog) converter 84 through a resistor 72, and the non-inverting input terminal of the operational amplifier 66 of the I-V converter 44B is connected to an D/A converter 82 through a resistor 72.

Connection of D/A converters 82 and 84 to the I-V converters 44B and 44A makes it possible for dark current to be available across the laser diodes 2 and 4, which will be described in detail later.

The characteristic feature of the laser scanning device 300 is that the driving signals to be applied to the laser diodes 2 and 4 have the same predetermined period but different phases. In order to achieve the above feature, the laser scanning device 300 has a laser printer control unit 100, a signal generating unit 110 which generates AM (amplitude modulating) signals S1 and S2 for driving the laser diodes 2 and 4. The laser printer control unit 100 and the signal generating unit 110 are connected with a cable 120. The signal generating unit 110 generates the signals S1 and S2 based on the image data transmitted from the laser printer control unit 100 and a clock signal.

Specifically, the laser printer control unit 100 has clock generator 78A which generates a clock signal CLK1 synchronously with the horizontal synchronizing signal HS output by the write position detecting circuit 24. The clock signal CLK1 is inverted by a NOT gate 78B, which outputs a clock signal CLK2.

The control unit 100 further includes image memories 90 and 91. The image memory 90 stores an image data corresponding to one of the two adjacent scanning lines; and the image memory 91 stores an image data corresponding to the other of the two adjacent scanning lines. The image data stored in the image memory 90 is read out synchronously with the clock CLK1 output from the clock generator 78A; and the image data stored in the image memory 91 is read out synchronously with the clock CLK2 output by the NOT gate 78B. The printer control unit 100 is further provided with a CPU (Central Processing Unit) 80 for controlling entire operation of the laser scanning device 300.

The CPU 80 controls the polygonal mirror motor controlling circuit 22 to rotate the polygonal mirror 16. Writing of the image data in the image memories 90 and 91 is also controlled by the CPU 80. The CPU 80 further sends predetermined data to D/A (digital-to-analog) converters 82 and 84 for setting a white level, and another predetermined data to D/A converters 86 and 88 for setting a black level.

Note that the white level is a level at which the above-described dark current is available in the laser diodes 2 and 4. The intensity of the laser beams emitted by the laser diodes 2 and 4 when the white level current flows are weak and will not sensitize the photoconductive drum DRM. If the current available in the laser diodes 2 and 4 exceeds the white level current, the intensity of the laser beams become sufficiently strong, and the photoconductive drum DRM is sensitized.

The black level current is the maximum current which can flow through the laser diodes 2 and 4. When the laser diodes 2 and 4 emit the laser beams when the black level current is available, the intensity of the beams emitted by the laser diodes 2 and 4 are greatest. Accordingly, the tone density of the image corresponding to the black level current is the greatest.

The D/A converters 82 and 84 receive the data for setting the white level from the CPU 80, and output voltage signal (analog values) corresponding to the received data. The voltage output by the D/A converter 82 is applied to an adder 96 and the I-V converter 44B; the voltage output by the D/A converter 84 is applied to an adder 98 and to the I-V converter 44A.

The D/A converters 66 and 88 receive the data for setting the black level from the CPU 80, and output voltage signal (analog values) corresponding to the received data. The voltage values output by the D/A converter 86 and 88 are applied to D/A converters 92 and 94, and are referred to for amplitude modulating, respectively.

As described before, the image memories 90 and 91 store the image data to be printed, which are read synchronously with the clock signals CLK1 and CLK2, respectively. As shown in FIGS. 5(b) and 5(c), the clock signals CLK1 and CLK2 have the same period T, the clock signal CLK1 is a logical high during the period ta (a first half of the period T), and the clock signal CLK2 is a logical high during the period tb (a second half of the period T).

It should be noted that the image data used in the laser printer is a 10-bit data (bits D0 to D9), and accordingly each pixel of the image is represented by one of 1024 gradation levels.

The image data stored in the image memory 90 is transferred to the D/A converter 92, and the image data stored in the image memory 91 is transferred to the D/A converter 94.

The D/A converter 92 converts the image data transferred from the image memory 90 into an analog signal synchronously with the clock signal CLK1, and then outputs the signal to the adder 96. The D/A converter 94 converts the image data transferred from the image memory 91 into an analog signal synchronously with the clock signal CLK2, and then outputs it to the adder 98.

It should be noted that the D/A converters 92 and 94 adjust the output analog values such that the voltage of the analog values when all bits DO–D9 of the image data is "1" in equal to the voltage output by the D/A converters 86 and 88, respectively.

The adder 96 adds the output voltage of the D/A converter 82 and the output voltage of the D/A converter 92. The output voltage of the adder 96 is applied to the non-inverting input terminal of the differential amplifier 28 as the image signal S1. Similarly, the adder 98 adds the output voltage of the D/A converter 84 and the output voltage of the D/A converter 94. The output voltage of the adder 98 is applied to the non-inverting input terminal of the differential amplifier 30 as the image signal S2.

The relationship between the clock signals CLK1 and CLK2, and the image signals S1 and S2, and waveforms thereof are indicated in a timing chart shown by FIGS. 5(b), 5(c), 5(h) and 5(i).

The timing chart shown in FIGS. 5(a)–5(i) is described in detail hereinafter.

When the clock generator 78A receives the horizontal synchronizing signal HS from the write position detecting circuit 24, the clock generator 78A generates the clock signal CLK1 which has the period T synchronously with the horizontal synchronizing signal HS. In response to the clock generator 78A outputting the clock CLK1, the NOT gate 78B outputs the inverted clock signal CLK2. It should be noted that the duty cycle of the clock signal CLK1 (i.e., ta/T) is equal to 50%, and the duty cycle of the clock signal CLK2 (i.e., tb/T) is also equal to 50%.

Synchronously with the clock signals CLK1 and CLK2, the CPU 80 generates addresses of the image memories 90 and 91 from which the image data is to be sequentially read. Specifically, during the interval ta (i.e., when the clock signal CLK1 is logical high and the clock signal CLK2 is logical low), the CPU 80 generates an address AD1 of the image memory 90 corresponding to a pixel on the upper scanning line (see FIG. 5(d)). During the interval tb (i.e., when the clock signal CLK1 is logical low and the clock signal CLK2 is logical high), the CPU 80 generates an address AD2 of the image memory 91 corresponding a pixel on the lower scanning line (see FIG. 5(e)).

Synchronously with the generation of the addresses AD1 and AD2, the image data DT1 and DT2 stored in the image memories 90 and 91 are read, respectively, as shown in FIGS. 5(d)–5(g).

Figure 2A:
Figure 2B:
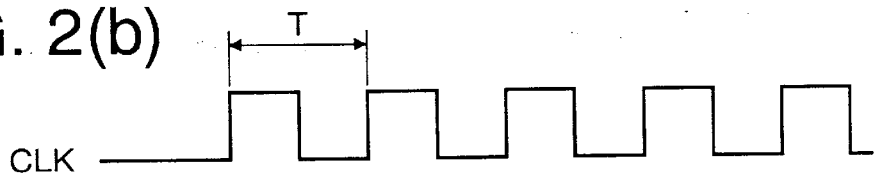
Figure 2C:
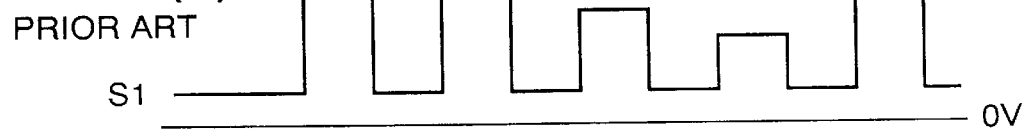
Figure 2D:
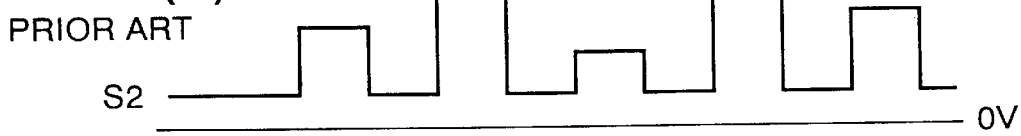

In the prior art shown in FIGS. 2(b)–2(d), image data for two scanning lines are read out of a memory at the same time. On the contrary, according to the embodiment, the image data for the two scanning lines are alternately read out of the memories 90 and 91. It should be noted that the period of the clock signals CLK1 and CLK2 is T, which is similar to the period of the clock signal CLK shown in FIG. 2(b). Therefore, the image data of pixels for two scanning lines are read within the period T, and accordingly, the duration of time necessary for forming two lines of image is unchanged with respect to the prior art shown in FIGS. 2(a)–2(d). In other words, according to the embodiment, a duration of time necessary for printing an entire image is reduced to a half duration with respect to a printer using only one laser beam.

Arrangement of the laser diodes 2 and 4 will now be described.

Figure 6:
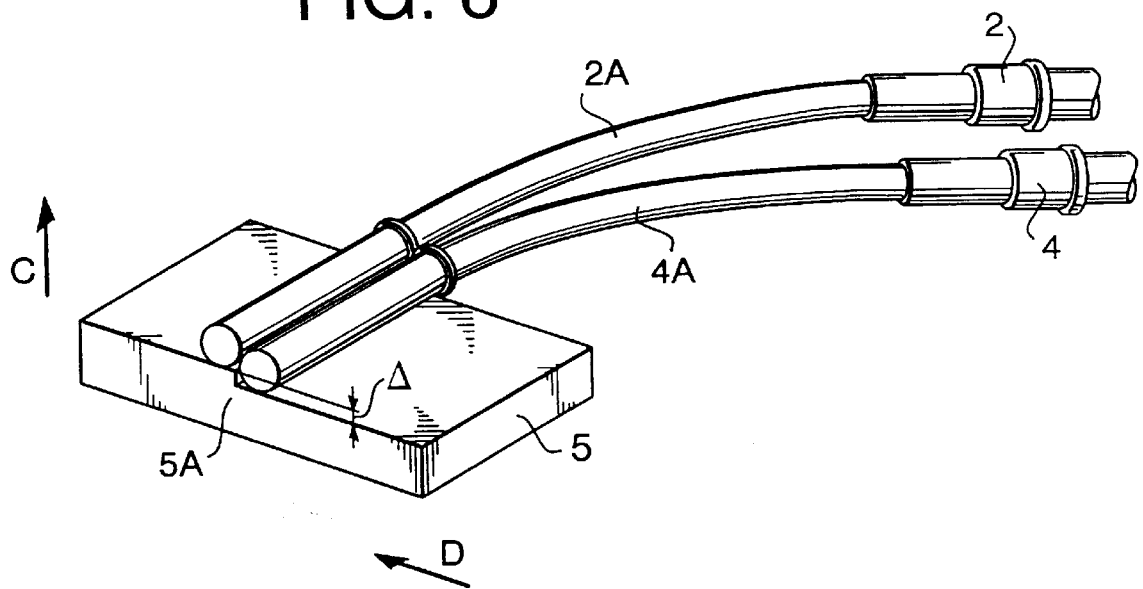

As shown in FIG. 6, in front of the laser diodes 2 and 4, the ends of a pair of optical fibers 2A and 4A are secured, respectively. The tips (the other ends) of the optical fibers 2A and 4A are supported on a plate member 5 parallel to each other, and next to each other. The plate member 5 is arranged inside the laser printer, such that the laser beams emitted from the tips of the optical fibers 2A and 4A are incident to the lens 6 shown in FIG. 3.

On a central portion of one surface of the plate member 5, a stepped portion SA is formed as shown in FIG. 6. The tip of the optical fiber 2A is mounted on the higher surface of the stepped portion 5A, and the tip of the optical fiber 4A are supported on the lower surface of the stepped portion 5A. The center of the optical fiber 2A and 4A is apart from each other by an amount Δ in the direction of an arrow C in FIG. 6. The plate member 5 is arranged inside the printer such that the direction C in FIG. 6 coincide with the arrow B in FIG. 3.

If the laser beams are emitted from the optical fibers 2A and 4A at the same time, a position on the photoconductive drum DRM to which the beam emitted from the optical fiber 2A is incident, and a position on the photoconductive drum DRM to which the beam emitted from the optical fiber 4A is incident are apart from each other by the amount Δ along the main scanning direction (the direction indicated by arrow B of the FIG. 3). The reason why the emitting positions of the laser beams are made different is for compensating a time deviation between the image signals S1 and S2.

As shown in the timing chart in FIGS. 5(a)–5(i), driving pulses of the image signal S2 is shifted by a half period (i.e., 1/2·T) with respect to the driving pulses of the image signal S1. Therefore, if the laser diodes 2 and 4 are provided at the same position in the main scanning direction, the positions on the photoconductive drum DRM where the laser beams emitted by the laser diodes 2 and 4 in accordance with the image signals S1 and S2 are incident are apart, in the main scanning direction, by an amount corresponding to the half period. By displacing the laser diode 4 by the amount Δ in the main scanning direction as shown in FIG. 6, the positions on the photoconductive drum DRM where the laser beams are incident are adjusted (i.e., the beams emitted by the laser diodes 2 and 4 are incident to the same positions in the main scanning direction). In other words, displacement of the formed images by the laser beams emitted by the laser diodes 2 and 4 can be cancelled by arranging the laser diodes 2 and 4 as described above and shown in FIG. 6.

The operation of the multi-beam scanning device 300 will be described in detail.

The laser beams emitted by the laser diodes 2 and 4 are converted into parallel beams, respectively, by the collimator lens 6. Then, the laser beams are split into the beams L2 and L4 for adjusting the intensity (i.e., APC), and the beams L1 and L3 for scanning.

The scanning laser beam L1 is converged in the auxiliary scanning direction by the cylindrical lens 14, and directed to the polygonal mirror 16. The laser beam L1 is then reflected by the reflecting surface of the polygonal mirror 16 and passed through the fθ lens 18 and scans on the photoconductive drum DRM to form a spot of light to sensitize the photoconductive surface of the photoconductive drum DRM.

The polygonal mirror 16 rotates in the direction of arrow A under control of the polygonal mirror motor controlling circuit 22. As the polygonal mirror 16 rotates, the incident angle of the laser beams L1 and L3 with respect to the reflection surfaces of the polygonal mirror 16 changes, and the spots formed on the photoconductive drum DRM scans in the main scanning direction.

When the laser beams L1 and L3 are incident to the mirror 26, the laser beams L1 and L3 are directed to the light receiving portion of the write position detecting circuit 24, respectively. As the laser beam L1 or L3 is incident, the write position detecting circuit 24 outputs the horizontal synchronizing signal HS.

As the write position detecting circuit 24 outputs the horizontal synchronizing signal HS, the clock generator 78A and the NOT gate 78B generate the clock signals CLK1 and CLK2, each having a period T synchronously with the horizontal synchronizing signal HS, as described before.

Synchronously with the clock signals CLK1 and CLK 2, the CPU 80 generates the addresses AD1 and AD2 of the image memories 90 and 91, from which address the image data is read. During the interval ta where the clock signal CLK1 is a logical high, the address AD1 for the image formed by the upper scanning line is given, and during the interval tb where the clock signal CLK2 is a logical high, the address AD2 for the image formed by the lower scanning line is given. The image data stored in the memories 90 and 91 are transferred, in accordance with the addresses AD1 and AD2, to the D/A converters 92 and 94 as data DT1 and DT2, respectively.

The D/A converters 92 and 94 convert the data DT1 and DT2, which are transferred from the memories 90 and 91 synchronously with the generation of addresses AD1 and AD2 (i.e., synchronously with the clock signals CLK1 and CLK2), into analog signals and output the analog signals to the adders 96 and 98, respectively.

The adder 96 adds the output voltage of the D/A converter 82 for setting the white level, and the output voltage of the D/A converter 92 for amplitude modulation, and outputs the added value as the image signal S1.

Similarly, the adder 98 adds the output voltage of the D/A converter 84 for setting the white level, and the output voltage of the D/A converter 94 for amplitude modulation, and outputs the added value as the image signal S2. The image signals S1 and S2 are applied to the non-inverting input terminals of the differential amplifiers 28 and 30, respectively.

The waveforms of the image signals S1 and S2 are shown in FIGS. 5(h) and 5(i). Note that each of the image signals S1 and S2 includes portions representative of the intensity of the emitted laser beam, and portions which do not contribute to the imaging operation. Specifically, in the image signal S1, for example, portions corresponding to the interval ta carry the data of the intensity of the laser beam. In the image signal S2, portions corresponding to the interval tb represent the data of the intensity of the laser beam. The portions contributing to modulation of the laser beam have a form of pulses. Accordingly, in the description, the portions representative of the intensity of the laser beam to be emitted are referred to as driving pulses Thus, the image signal S1 has a plurality of driving pulses, each pulse occurs during the interval ta. Similarly, the image signal S2 includes a plurality of driving pulses, each driving pulse occurring during the interval tb.

In the image signal S1, the voltage V1 of the signal during the interval ta (i.e., the driving pulse) represents the tone density of the corresponding pixel, i.e., the intensity of the laser beam emitted by the laser diode 2.

In the image signal S2, the voltage V2 during the interval tb (i.e., the driving pulse) represents the tone density of the corresponding pixel, i.e., the intensity of the laser beam emitted by the laser diode 4.

Voltage VM1 of the image signal S1 during the interval tb is the voltage corresponding to the white level. Similarly, voltage VM2 of the image signal S2 during the interval ta is also the voltage corresponding to the white level.

When the image signal S1 is input to the non-inverting input terminal of the differential amplifier 28, i.e., the voltage V representing the intensity of the laser beam to be emitted is applied to the non-inverting input terminal of the differential amplifier 28, the differential amplifier 28 outputs the voltage which is proportional to the difference between the supplied voltage V1 and the output voltage of the I-V converter 44A.

The V-I converter 32 converts the voltage output from the differential amplifier 28 into an electrical current and charges or discharges the hold condenser 36. Note that when the voltage output by the differential amplifier 28 is positive, the hold condenser 36 is charged, and when the voltage output by the differential amplifier 28 is negative, the hold condenser 36 is discharged.

The V-I converter 40 generates the electrical current the magnitude of which is proportional to the voltage of the hold condenser 36. Then the laser diode 2 emits the laser beam the intensity of which corresponds to the magnitude of the electrical current generated by the V-I converter 40.

The laser beam emitted by the laser diode 2 is split into two beams L1 and L2. The laser beam L2 for detection is converged by the lens 52, the intensity is adjusted by the aperture 56, and then enters the photo diode 48. Across the photo diode 48, the electrical current corresponding to the intensity of the received light is generated. The I-V converter 44A converts the electrical current flowing through the photo diode 48 into a voltage signal, and applies the voltage signal to the inverting input terminal of the differential amplifier 28. The differential amplifier 28 then outputs the voltage proportional to the difference between the voltage V1 of the image signal S1 and the voltage signal output by the I-V converter 44A which represents the intensity of the laser beam emitted by the laser diode 2.

Accordingly, when the voltage V1 is applied to the differential amplifier 28, the intensity of the laser beam emitted by the laser diode 2 is detected by the photo diode 48, and based on the detection result, the current flowing through the laser diode 2 is adjusted so that the intensity of the laser beam emitted by the laser diode 2 accurately corresponds to the voltage V1. In other words, the laser diode 2 is feed-back controlled (i.e., the APC is performed) so that the intensity of the laser beam emitted by the laser diode 2 accurately corresponds to the voltage V1 of the image signal S1.

Note that the white level setting voltage output by the D/A converter 84 is applied to the inverting amplifier 62 of the I-V converter 44A. The purpose of this application of the voltage is to cancel the affect of the emission of the laser beam corresponding to the white level by the laser diode 4 during the above-described APC operation.

That is, during the interval ta, the laser diode 2 is driven to emit the laser beam having the intensity corresponding to the voltage V1 of the image signal S1, the laser diode 4 also emits the laser beam which corresponds to the white level since the dark current is available in the laser diode 4 during the interval ta. The laser beam emitted by the laser diode 4 is also incident to the photo diode 48 via the beam splitter 10, the current flowing through the photo diode 48 includes the current corresponding to the laser emitted by the laser diode 4 even during the interval ta. This component corresponding to the laser beam emitted by the laser diode 4 should be excluded for performing the APC for the laser diode 2 accurately.

Accordingly, in the embodiment, the white level setting voltage output by the D/A converter 84 is applied to the inverting amplifier 62 of the I-V converter 44A and the resistance of the resistors 72 and 74 are adjusted so that the affection of the component of the laser beam emitted by the laser diode 4 is cancelled.

When the image signal S2 is input to the non-inverting input terminal of the differential amplifier 30, i.e., the voltage V2 representing the intensity of the laser beam to be emitted is applied to the non-inverting input terminal of the differential amplifier 30, the differential amplifier 30 outputs the voltage which is proportional to the difference between the supplied voltage V2 and the output voltage of the I-V converter 44B.

The V-I converter 34 converts the voltage output from the differential amplifier 30 into an electrical current and charges or discharges the hold condenser 38. Note that when the voltage output by the differential amplifier 30 is positive, the hold condenser 38 is charged, and when the voltage output by the differential amplifier 30 is negative, the hold condenser 38 is discharged.

The V-I converter 42 generates the electrical current, the magnitude of which is proportional to the voltage of the hold condenser 38. Then, the laser diode 4 emits the laser beam, the intensity of which corresponds to the magnitude of the electrical current generated by the V-I converter 42.

The laser beam emitted by the laser diode 4 is split into two beams L3 and L4. The laser beam L3 for detection is converged by the lens 52, the intensity is adjusted by the aperture 56, and then enters the photo diode 48. Across the photo diode 48, the electrical current corresponding to the intensity of the received light is generated. The I-V converter 44B converts the electrical current flowing through the photo diode 48 into a voltage signal, and applies the voltage signal to the inverting input terminal of the differential amplifier 30. The differential amplifier 30 then outputs the voltage proportional to the difference between the voltage V2 of the image signal S2 and the voltage signal output by the I-V converter 44B which represents the intensity of the laser beam emitted by the laser diode 4.

Accordingly, when the voltage V2 is applied to the differential amplifier 30, the intensity of the laser beam emitted by the laser diode 4 is detected by the photo diode 48, and based on the detection result, the current flowing through the laser diode 4 is adjusted so that the intensity of the laser beam emitted by the laser diode 4 accurately corresponds to the voltage V2. In other words, the laser diode 4 is feed-back controlled (i.e., the APC is performed) so that the intensity of the laser beam emitted by the laser diode 4 accurately corresponds to the voltage V2 of the image signal S2.

Note that the white level setting voltage output by the D/A converter 82 is applied to the inverting amplifier 62 of the I-V converter 44B. The purpose of this application of the voltage is to cancel the affect of the emission of the laser beam corresponding to the white level by the laser diode 2 during the above-described APC operation.

That is, during the interval tb, the laser diode 4 is driven to emit the laser beam having the intensity corresponding to the voltage V2 of the image signal S2, the laser diode 2 also emits the laser beam which corresponds to the white level since the dark current is available in the laser diode 2 during the interval tb. The laser beam emitted by the laser diode 2 is also incident to the photo diode 48 via the beam splitter 10, the current flowing through the photo diode 48 includes the current component corresponding to the laser emitted by the laser diode 2 even during the interval tb. This component corresponding to the laser beam emitted by the laser diode 2 should be excluded for performing the APC for the laser diode 4 accurately.

Accordingly, in the embodiment, the white level setting voltage output by the D/A converter 82 is applied to the inverting amplifier 62 of the I-V converter 44B and the resistance of the resistors 72 and 74 are adjusted so that the affection of the component of the laser beam emitted by the laser diode 2 is cancelled.

Figure 7A:
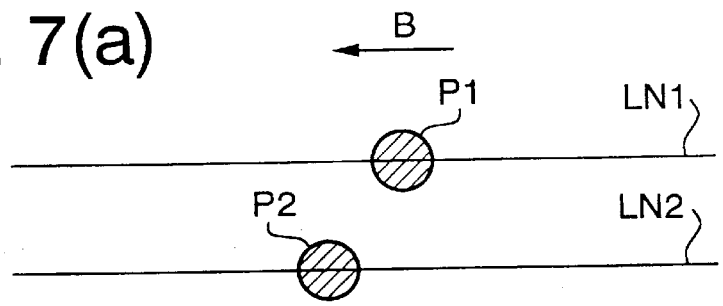
Figure 7B:
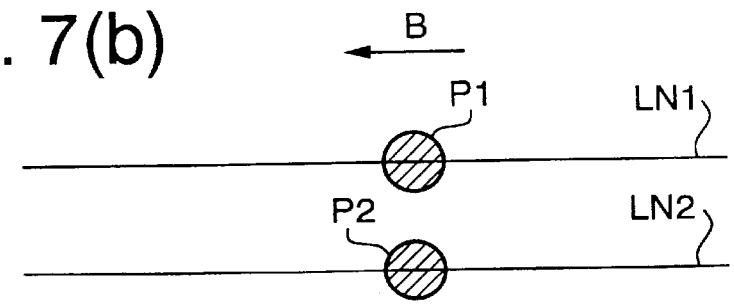

The laser beams L1 and L3 for scanning which are emitted under the APC as described above are incident to the polygonal mirror 16 via the beam splitter 10 and the cylindrical lens 14, and then deflected to scan the photoconductive drum DRM to form a pair of scanning lines as shown in FIG. 7(b).

In FIG. 7(b), line LN1 is a scanning line formed by the scanning laser beam L1, and line LN2 is a scanning line formed by the scanning laser beam L3. The distance between the lines LN and LN2 corresponds to the distance between the centers of the optical fibers 2A and 4A in the direction of arrow D in FIG. 6. In FIG. 7(b), the direction indicated by arrow B is the main scanning direction.

In FIG. 7(b), dots P1 and P2 are pixels arranged at the same position in the main scanning direction. That is, if the pixel P1 is the n-th pixel from an end of the scanning line ON1, the pixel P2 is also the n-th pixel form the end of the scanning line LN2. The tone density of these n-th pixels P1 and P2 are determined by the voltages V1 and V2 of the image signals S1 and S2 at the n-th period.

As described before, the voltage V1 for a pixel P1 of the upper scanning line LN1 is given in the interval ta within the period T, and the voltage V2 for the pixel P2 of the lower scanning line LN2 is given in the interval tb within the period T. Accordingly, the phase of the image signal S2 is shifted by a half of the period T to the image to the image signal S1. If the tips of the optical fibers 2A and 4A are arranged at the same position in the main scanning direction, but not shifted as shown in FIG. 6, the pixel P2 would be arranged on downstream side with respect to the pixel P1 as shown in FIG. 7(a). In the embodiment, however, since the tips of the optical fibers 2A and 4A are arranged as shown in FIG. 6, the displacement shown in FIG. 7(a) is compensated, and the pixels P1 and P2 are located at the same position in the main scanning direction.

As described above, according to the laser scanning device 300, for two laser diodes, a single scanning optical system and a single photo diode are sufficient. Accordingly, the laser scanning device can be made compact in size, and the manufacturing cost can also be decreased.

It should be noted that the displacement of the pixels due to the phase difference of the image signals S1 and S2 can be compensated in various ways. For example, by rotating two laser diode fixedly arranged on the same plane about an axis parallel to the optical axis, the distance between the laser diodes in the main scanning direction can be changed. Alternatively, with use of an appropriate optical system, positional relationship of two laser beams can be changed.

In the above embodiment, the laser scanning device uses only two laser diodes. However, it is possible to use more than two laser beams. If three laser beams are used, for example, a period T is divided into three intervals, and three laser diodes are driven in the respective divided intervals with performing the APC operation.

The present disclosure relates to subject matter contained in Japanese Patent Application No. HEI 8-22132, filed on Jan. 12, 1996, which is expressly incorporated herein by reference in its entirety.

What is claimed is:

1. A laser scanning device which scans a surface with a plurality of laser beams in accordance with an image data, comprising:

a plurality of light sources that output said plurality of laser beams, respectively;

a deflecting member that deflects said plurality of laser beams to scan said surface, a plurality of scanning lines being formed on said surface in one scanning operation;

a driving system that drives said plurality of light sources, not simultaneously, in accordance with said image data; and an adjusting system that adjusts a scanning position between each of said plurality of scanning lines, each of said plurality of light sources being sequentially driven at every predetermined period.

2. The laser scanning device according to claim 1, wherein a timing at which each of said plurality of light sources is driven is shifted, within each of said predetermined period, by an amount T/n, wherein T is a time duration of said predetermined period; and n is a number of said light sources to be driven.

3. The laser scanning device according to claim 1, wherein each of said plurality of light sources comprise a laser diode.

4. The laser scanning device according to claim 1, wherein each of said plurality of light sources comprises a light emitting portion, and wherein said adjusting means comprises a mounting member on which said light emitting portion of each of said plurality of light sources is mounted, said light emitting portion being arranged so that a displacement between each scanning line, of said plurality of scanning lines, in a scanning direction is canceled.

5. The laser scanning device according to claim 1, further comprising means for adjusting an intensity of said laser beam emitted by each light source of said plurality of light sources in accordance with said image data, said adjusting means including a feed-back control system.

6. The laser scanning device according to claim 5, wherein said feed-back control system comprises means for detecting a difference between an intensity of an emitted laser beam and an intensity according to said image data, and means for controlling said driving system to adjust said intensity of said laser beam in accordance with said difference detected by said detecting means.

7. A laser scanning device which scans a surface with a plurality of laser beams in accordance with an image data, comprising:

a plurality of light sources that output said plurality of laser beams, respectively;

a polygonal mirror having a plurality of reflecting surfaces, said polygonal mirror deflecting said plurality of laser beams to scan said surface, a plurality of scanning lines being formed on said surface in one scanning operation;

an image signal outputting unit that outputs image signals for said plurality of light sources, respectively, said image signals including a plurality of driving pulses, each of said driving pulses representing an intensity of light of a laser beam, said driving pulses of each of said image signals being generated at every predetermined period, phases of said image signals being shifted within said predetermined period;

a driving system for said plurality of light sources, said driving system driving said plurality of light sources in accordance with said driving pulses; and an image position adjusting mechanism that compensates for a displacement of an image position formed by said plurality of light sources caused by said phase difference between each image signal.

8. The laser scanning device according to claim 7, wherein said driving pulses of said plurality of image signals are generated alternately within said predetermined period.

9. The laser scanning device according to claim 8, wherein each of said driving pulses represents one of a plurality of gradation levels.

10. The laser scanning device according to claim 9, wherein said driving system includes a feed-back control for adjusting an intensity of said laser beam emitted by each of said light source in accordance with said image data.

11. The laser scanning device according to claim 8, wherein said driving pulses are output sequentially and at a different timing within said predetermined period.

12. The laser scanning device according to claim 7, wherein said driving pulses of said plurality of image signals are sequentially generated within said predetermined period.

13. The laser scanning device according to claim 12, wherein one driving pulse is included in each of said plurality of image signals within said predetermined period.

14. The laser scanning device according to claim 12, wherein a phase difference between each image signal is expressed as T/n, where T is a time duration of said predetermined period, and n is the number of said image signals.

15. The laser scanning device according to claim 7, wherein each of said plurality of light sources comprise a laser diode.

16. The laser scanning device according to claim 7, wherein each of said plurality of light sources comprises a laser diode and an optical fiber, an end of said optical fiber being secured to a light emitting portion of said laser diode, and wherein said adjusting mechanism comprises a supporting member on which the other ends of said optical fibers are supported such that said other ends of each of said optical fibers are apart from each other by a first distance in a scanning direction of said laser beams, and by a second distance in a direction perpendicular to said scanning direction of said laser beams.

* * * * *